Figure 1:
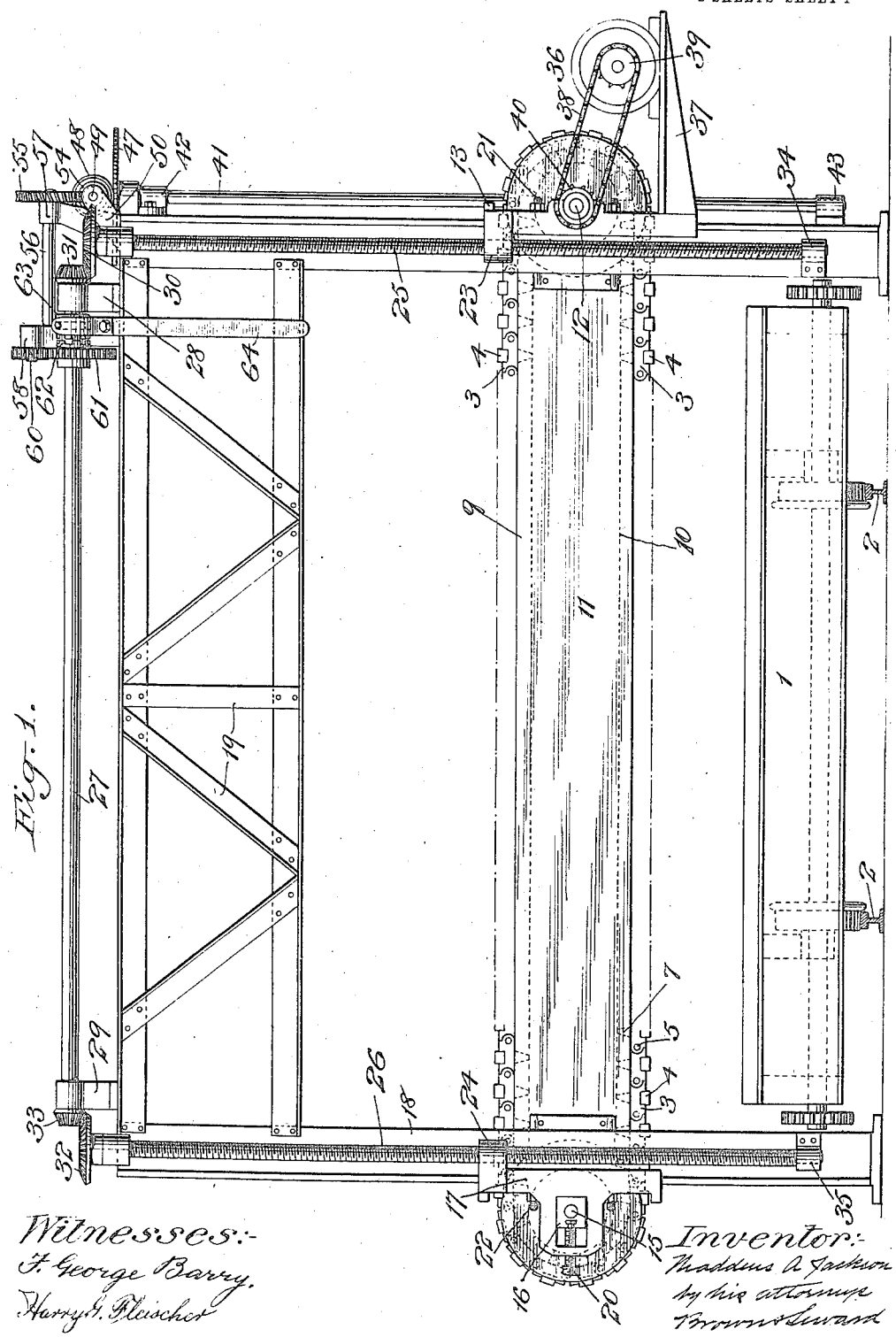

T. A. JACKSON.
ENDLESS CHAIN SAW.
APPLICATION FILED MAY 9, 1911.

1,043,433.

Patented Nov. 5, 1912.
2 SHEETS—SHEET 1.

Witnesses:—
F. George Barry.
Harry G. Fleischer.

Inventor:—
Thaddeus A. Jackson
by his attorneys
Brown & Seward

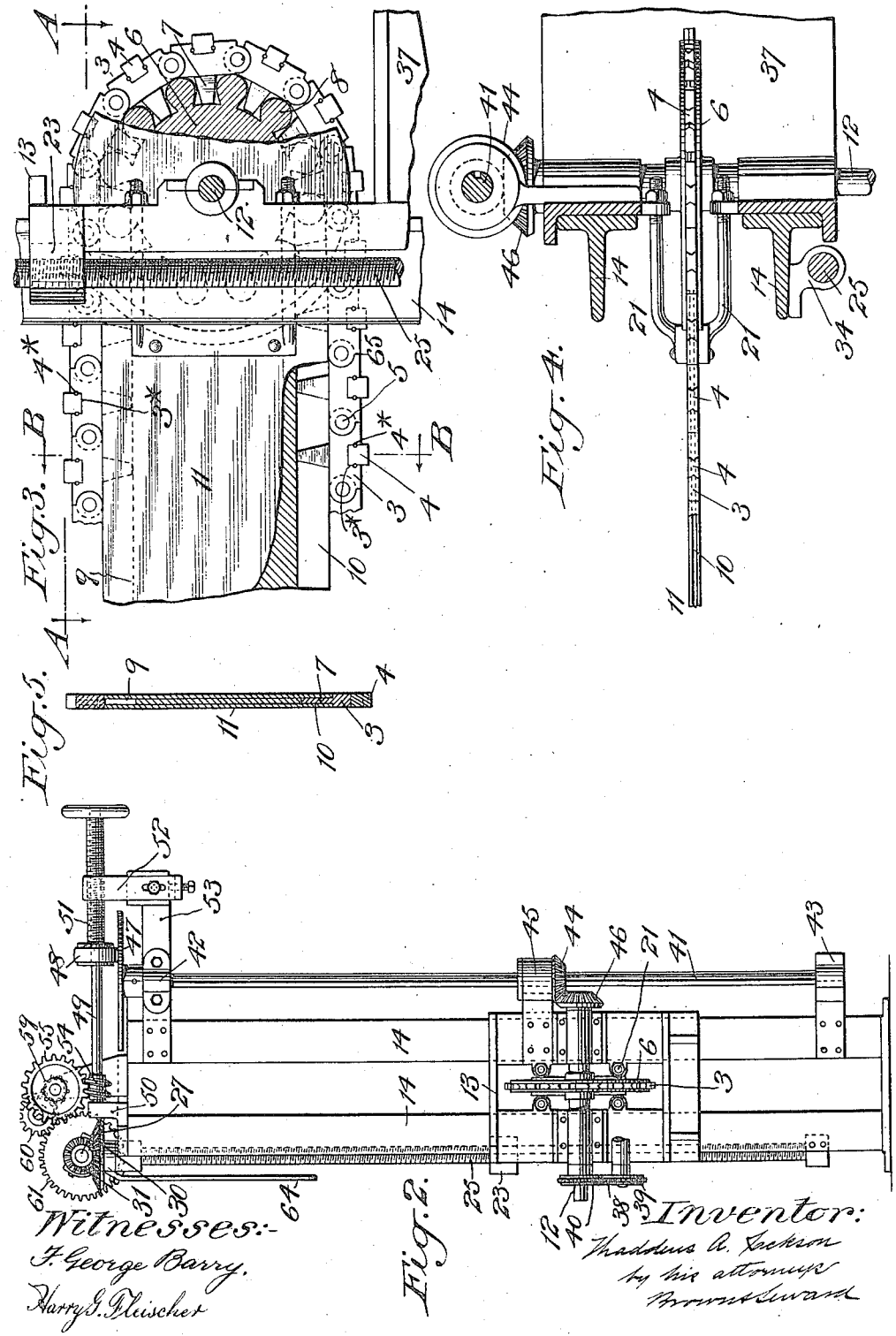

UNITED STATES PATENT OFFICE.

THADDEUS A. JACKSON, OF NEW YORK, N. Y., ASSIGNOR TO EMANUEL S. ROSE, OF NEW YORK, N. Y.

ENDLESS CHAIN SAW.

1,043,433.

Specification of Letters Patent. Patented Nov. 5, 1912.

Application filed May 9, 1911. Serial No. 626,010.

*To all whom it may concern:*

Be it known that I, THADDEUS A. JACKSON, a citizen of the United States, and resident of the borough of Brooklyn, in the city and State of New York, have invented a new and useful Improvement in Endless Chain Saws, of which the following is a specification.

This invention relates to endless chain saws and has for its objects to provide certain improvements in the construction, form and arrangement of the several parts whereby the machine is materially simplified and strengthened and its operation facilitated; means being employed for positively moving the saw toward and away from its work and for readily adjusting the speed of the saw feeding means with respect to the speed of the saw driving means.

This invention is shown in connection with a stone cutting machine.

In the accompanying drawings, Figure 1 represents the machine in front elevation. Fig. 2 represents the machine in end elevation. Fig. 3 is an enlarged detail sectional view showing a portion of the endless chain saw and the parts adjacent thereto. Fig. 4 is a horizontal section taken in the plane of the line A—A of Fig. 3, and Fig. 5 is a vertical transverse section taken in the plane of the line B—B of Fig. 3.

The truck for supporting the work is denoted by 1 and is herein shown as movable along a track 2, for bringing the work into position beneath the endless chain saw. The saw comprises an endless series of chain links 3 bearing teeth 4 the pivot connections between the links being denoted by 5. This endless chain saw is disposed horizontally and at its ends it passes around sprocket wheels 6, the chain links 3 being provided with teeth 7 arranged to be engaged by the teeth 8 on the sprocket wheels 6. These teeth 7 of the sprocket chain pass along within upper and lower grooves 9, 10, in a guide 11 located intermediate the sprocket wheels 6, for holding the chain against lateral movement. The sprocket wheel 6 at one end of the chain is provided with a shaft 12 mounted in suitable bearings in a bracket 13 fitted to slide along the uprights 14 of the said supporting frame. The sprocket wheel 6 at the other end of the chain is provided with a shaft 15 mounted in adjustable bearings 16 of a bracket 17 fitted to slide vertically along the uprights 18 at the other side of the saw supporting frame. The upper ends of these side uprights 14, 18, are connected by a truss beam 19. The bearings 16 for the sprocket wheel shaft 15 may be adjusted by the adjusting screws 20, one of which only is shown herein for tightening the chain saw. The brackets 13, 17, are fixedly secured to the cross-piece 11 so as to form a support therefor. This is accomplished in the present instance by means of yoke bolts 21, 22. These brackets 13, 17, are provided with lugs 23, 24, which engage rotary vertical screws 25, 26, driven from a cross shaft 27 mounted in suitable bearings 28, 29, on the truss beam 19, in the present instance, by bevel gear connections 30, 31, for the screw 25, and 32, 33, for the screw 26. The lower ends of these screws are rotatably mounted in brackets 34, 35, on the side uprights 14 and 18, of the saw supporting frame.

The saw may be driven from a motor 36 mounted on a shelf 37 of the bracket 13. A driving chain 38 is employed, which chain passes around a sprocket 39 on the shaft of the motor 36, and around a sprocket 40 on the shaft 12 of the adjacent chain saw sprocket wheel 6.

The means for feeding the saw to its work and for moving the saw away from its work, is driven from the motor 36, and is constructed, arranged and operated as follows: A vertical shaft 41 is rotatably mounted in upper and lower bearings 42, 43, on the side upright 14 of the saw supporting frame, which shaft has a sliding feather and groove connection with a bevel gear 44 mounted in a suitable bearing 45 carried by the bracket 13, which bevel gear 44 meshes with a bevel gear 46 fixed to the shaft 12 of the adjacent chain saw driving sprocket wheel 6. This vertical rotary shaft 41 is provided with a friction driving disk 47 at its upper end, which disk is engaged by a friction wheel 48 having a sliding feather and groove connection with a cross shaft 49 mounted at one end in a suitable bearing 50, and at its other end in a hollow adjusting screw 51 having a screw-threaded engagement with a block 52 adjustable on a bracket 53 supported by the upright 14 of the saw carrying frame. This screw 51 is of sufficient length to adjust the friction wheel 48 across the center of the friction disk 47, so as to cause the shaft 49 to be rotated in either direction and at varying speeds according to the position of the friction wheel 48. This shaft 49 has a worm and gear connection 54, 55, with a shaft 56 mounted in suitable bearings 57, 58. This shaft 56 is further provided with a spur gear 59 which meshes with an intermediate gear 60 which, in turn, meshes with a gear 61 loose on the shaft 27. A clutch is provided for clutching the gear 61 to and releasing it from driving connection with the shaft 27, one member 62 of the clutch being carried by the loose gear 61 and the other member 63 of the clutch having a sliding interlocked connection with said shaft 27. A hand lever 64 is provided for throwing the clutch into and out of operation.

For the purpose of making the connecting piece 11 which carries the endless chain saw, very strong, it is preferably made laminated, the inner lamina being of less width than the outer laminæ, thereby forming the upper and lower grooves 9, 10, for receiving the sprocket teeth 7 of the chain. The links 3 of the chain are of sufficient width to overlap the lower edges of the outer laminæ of the piece 11 and thus have a bearing thereon, and the teeth 7 are of sufficient length to have a bearing on the edges of the inner lamina of said connecting piece. To further strengthen the chain, the outer portions of the links 3 abut as shown at 65, when the chain is straightened, thus helping to prevent the chain from being forced inwardly when acting upon its work.

From the above description it will be seen that by adjusting the ratio of the friction drive connection 47, 48, the feeding movement of the saw may be varied with respect to the speed of the saw.

The saw teeth 4 are removably attached to the links 3, as follows: The links 3 are provided with recesses 3* into which the teeth 4 are inserted, the shape of the recesses and the shape of the teeth being such that the teeth are interlocked with the links against lateral displacement. Pins 4* are provided for locking the saw teeth to the links against outward displacement.

It will also be seen that the saw may be moved away from its work at any time by adjusting the friction wheel 48 across the center of the friction disk 47.

Furthermore, it will be seen that by the provision of a friction drive connection all danger of breakage to the parts by any undue strain upon the feed will be obviated.

It is evident that various changes might be resorted to in the construction, form and arrangement of the various parts without departing from the spirit and scope of my invention; hence I do not wish to limit myself strictly to the structure herein shown and described, but

What I claim is:

1. In a machine of the character described, an endless chain saw, brackets for supporting it, a piece connecting the brackets forming a guide for the saw and serving to prevent lateral movement of the cutting portion of the saw, rotary screws engaging the brackets for raising and lowering the saw and means for driving the saw and for rotating said screws.

2. In a machine of the character described, an endless chain saw, brackets for supporting it, a piece connecting the brackets having channels running longitudinally in its upper and lower edges forming a guide for the saw to prevent lateral movement thereof, rotary screws engaging the brackets for raising and lowering the saw and means for driving the saw and for rotating said screws.

3. In a machine of the character described, an endless chain saw, brackets for supporting it, a piece connecting the brackets forming a guide for the saw and serving to prevent lateral movement of the cutting portion of the saw, rotary screws engaging the brackets for raising and lowering the saw, a motor for driving the saw and means driven from the motor for rotating said screws in either direction.

4. In a machine of the character described, an endless chain saw, brackets for supporting it, a piece connecting the brackets having channels running longitudinally in its upper and lower edges forming a guide for the saw to prevent lateral movement thereof, rotary screws engaging the brackets for raising and lowering the saw, a motor for driving the saw and means driven from the motor for rotating said screws in either direction.

5. In a machine of the character described, an endless chain saw, brackets for supporting it, a piece connecting the brackets forming a guide for the saw and serving to prevent lateral movement of the cutting portion of the saw, rotary screws engaging the brackets for raising and lowering the saw, a motor carried by one of the brackets for driving the saw and means driven from the motor for rotating said screws in either direction.

6. In a machine of the character described, an endless chain saw, brackets for supporting it, a piece connecting the brackets having channels running longitudinally in its upper and lower edges forming a guide for the saw to prevent lateral movement thereof, rotary screws engaging the brackets for raising and lowering the saw, a motor carried by one of the brackets for driving the saw and means driven from the motor for rotating said screws in either direction.

7. In a machine of the character described, an endless chain saw, brackets for supporting it, a piece connecting the brackets forming a guide for the saw and serving to prevent lateral movement of the cutting portion of the saw, rotary screws engaging the brackets for raising and lowering the saw, a motor carried by one of the brackets for driving the saw and means driven from the motor for rotating said screws in either direction, said means including a friction disk and wheel.

8. In a machine of the character described, an endless chain saw, brackets for supporting it, a piece connecting the brackets having channels running longitudinally in its upper and lower edges forming a guide for the saw to prevent lateral movement thereof, rotary screws engaging the brackets for raising and lowering the saw, a motor carried by one of the brackets for driving the saw and means driven from the motor for rotating said screws in either direction, said means including a friction disk and wheel.

In testimony, that I claim the foregoing as my invention, I have signed my name in presence of two witnesses, this twenty-seventh day of April, 1911.

THADDEUS A. JACKSON.

Witnesses:
  F. GEORGE BARRY,
  HENRY C. THIEME.